(12) United States Patent
Tokuyasu et al.

(10) Patent No.: US 7,677,097 B2
(45) Date of Patent: Mar. 16, 2010

(54) HEATING RESISTOR-TYPE GAS FLOWMETER

(75) Inventors: Noboru Tokuyasu, Hitachinaka (JP); Hiroaki Hoshika, Hitachiomiya (JP); Kaori Kashio, Sakura (JP); Keiji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/128,323

(22) Filed: May 28, 2008

(65) Prior Publication Data

US 2008/0295575 A1 Dec. 4, 2008

(30) Foreign Application Priority Data

May 29, 2007 (JP) ............... 2007-141263

(51) Int. Cl.
*G01F 1/68* (2006.01)

(52) U.S. Cl. ............... 73/204.15; 73/204.26; 73/23.31; 204/424

(58) Field of Classification Search ............ None
See application file for complete search history.

(56) References Cited

U.S. PATENT DOCUMENTS

| | | | |
|---|---|---|---|
| 2,733,605 A * | 2/1956 | Buck ............... | 73/204.14 |
| 4,264,961 A | 4/1981 | Nishimura et al. | |
| 4,523,463 A | 6/1985 | Fathauer et al. | |
| 4,856,330 A | 8/1989 | Honda et al. | |
| 5,189,910 A | 3/1993 | Onda | |
| 5,207,765 A | 5/1993 | Eiermann et al. | |
| 5,864,062 A * | 1/1999 | Nagahara et al. ...... | 73/514.01 |
| 5,922,938 A * | 7/1999 | Hafele ............... | 73/23.32 |
| 6,253,606 B1 | 7/2001 | Yonezawa et al. | |
| 6,382,023 B1 | 5/2002 | Yonezawa et al. | |
| 6,393,907 B1 | 5/2002 | Yamakawa et al. | |

FOREIGN PATENT DOCUMENTS

| | | |
|---|---|---|
| JP | 5-248909 | 9/1993 |
| JP | A-06-137917 | 5/1994 |
| JP | A-08-062009 | 3/1996 |
| JP | A-11-083585 | 3/1999 |

(Continued)

OTHER PUBLICATIONS

Notice of Reasons for Rejection in Japanese Patent Application No. 2007-141263, issued Oct. 8, 2009 (with partial translation).

*Primary Examiner*—Harshad Patel
(74) *Attorney, Agent, or Firm*—Brundidge & Stanger, P.C.

(57) ABSTRACT

In a gas flowmeter in which a rod and a sensor element are formed as a single body, for preventing heat of the sensor element from flowing into a sensor probe through a substrate (rod) so as to suppress considerable power consumption, and for obtaining a necessary response speed with respect to a flow rate of gas to be measured or a change in temperature, the gas column (rod) is made of an insulating material on a center axis of the sensing probe and is formed with a conductor pattern on its surface, and the sensing probe connects the sensor element disposed in a pipe through which the gas to be measured flows and a harness terminal through the conductor on the surface of the rod, so as to measure a gas flow rate by using the sensing prove.

10 Claims, 12 Drawing Sheets

FOREIGN PATENT DOCUMENTS

| | | |
|---|---|---|
| JP | A-11-183216 | 7/1999 |
| JP | A-11-326000 | 11/1999 |
| JP | A-2001-091322 | 4/2001 |
| JP | A-2003-194606 | 7/2003 |
| JP | A-2007-101426 | 4/2007 |
| JP | 2007-248136 | 9/2007 |
| JP | 2007-285756 | 11/2007 |

* cited by examiner

HEATING RESISTOR-TYPE GAS FLOWMETER

FIELD OF THE INVENTION

The present invention relates to a gas flowmeter which measures a mass flow of an exhaust gas to be discharged from through an internal combustion engine.

DESCRIPTION OF RELATED ART

As a related art known example, JP-A-5-248909 discloses an exhaust gas flowmeter in which a substrate is made of a material having low thermal conductivity, and a tip of each temperature sensor is covered with a temperature transfer film made of a material having high thermal conductivity. A flow rate detection principle is as follows. That is, when an exhaust gas flows through the temperature sensor, a gas flow rate is detected based on a change in temperature distribution of a heater.

In a related art sensing probe structure, a sensing heater is formed on a surface of a rod corresponding to a column of the present invention. That is, the rod and a sensor element are formed as a single body. This is different from the structure of the present invention. With the structure of the known example in which the rod and the sensor element are formed as a single body, heat of the sensor element flows into the sensor probe through the substrate (rod), which leads to considerable power consumption. Furthermore, such phenomenon is accompanied by deterioration of sensitivity to the flow rate of a gas to be measured or a change in temperature. For this reason, a necessary response speed may not be obtained.

SUMMARY OF THE INVENTION

It is an object of the present invention to provide a sensing probe structure and a gas flowmeter capable of, even in a severe environment of an exhaust gas discharged from an internal combustion engine, rendering sufficient strength to be good for a long time and measuring a mass flow with high reliability, thereby ensuring high accuracy and quality.

In order to achieve the above-described object, the present invention provides a gas flowmeter including, as a single body, a rod-shaped member made of an insulating material, a flow sensor provided at one end of the rod-shaped member, an output section provided at the other end of the rod-shaped member, surface wirings provided on the surface of the rod-shaped member to electrically connect the flow sensor element and the output section, and a seal member of the rod-shaped member provided between the flow sensor element and the output section.

According to the present invention, even under a severe environment of an exhaust gas discharged from an internal combustion engine, sufficient strength to be good for a long time can be rendered, and a mass flow can be measured with high reliability, thereby ensuring high accuracy and quality.

Other objects, features and advantages of the invention will become apparent from the following description of the embodiments of the invention taken in conjunction with the accompanying drawings.

DETAILED DESCRIPTION OF THE INVENTION

Hereinafter, an embodiment according to the present invention will be described with reference to the drawings.

Figure 1:
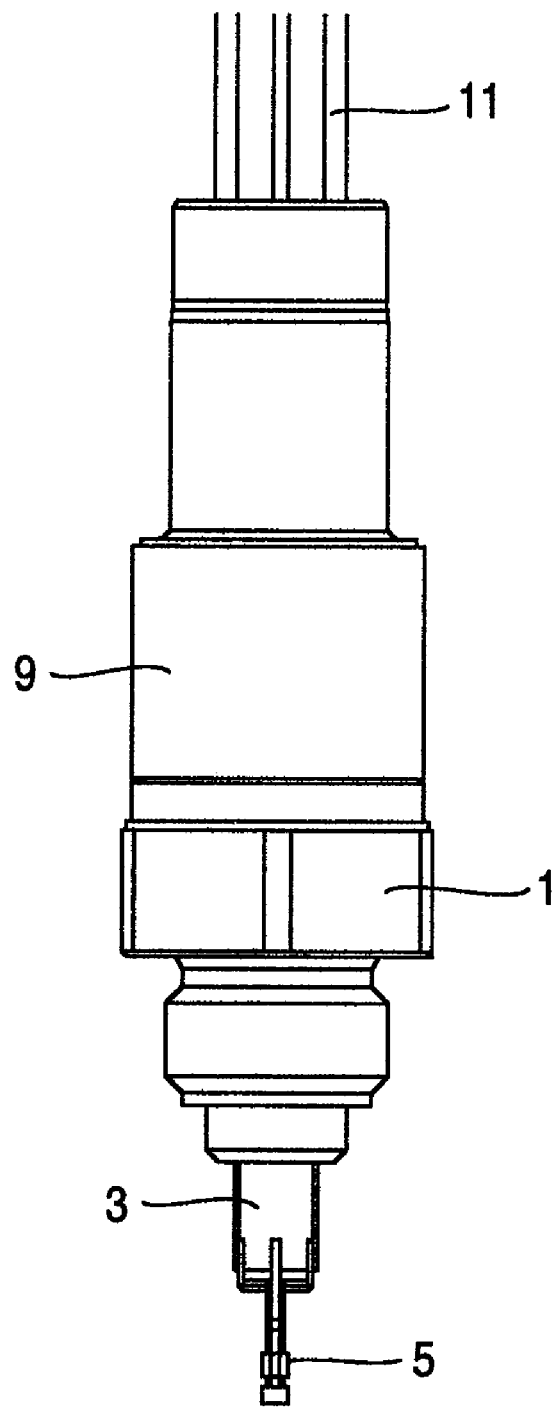
FIG. 1 is a diagram schematically illustrating the construction of a gas flowmeter sensing probe according to the present invention.
Figure 2:
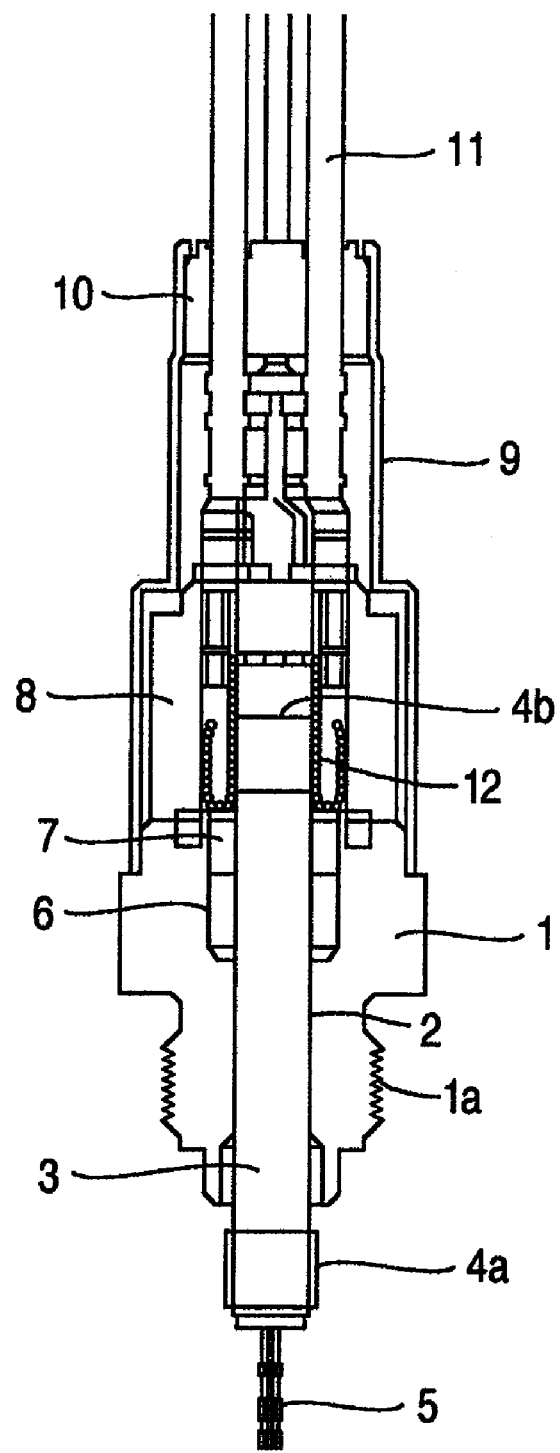
FIG. 2 is a cross-sectional view of the gas flowmeter sensing probe according to the present invention.

First, the schematic construction of a gas flowmeter sensing probe of the present invention will be described with reference to FIG. 1. FIG. 1 is an exterior view of a gas flowmeter sensing probe according to this embodiment. FIG. 2 is a cross-sectional view of the gas flowmeter sensing probe.

A holder 1 is formed with a cylindrical insertion hole 2 into which a cylindrical rod 3 is inserted. The cylindrical rod 3 extends through the insertion hole 2 and outwardly projects from opposing axial end surfaces of the holder 1. Electrode portions 4a and 4b are formed at both axial ends of the cylindrical rod 3. Preferably, the cylindrical rod 3 is made of an insulator, for example, ceramics, such as alumina.

Figure 3:
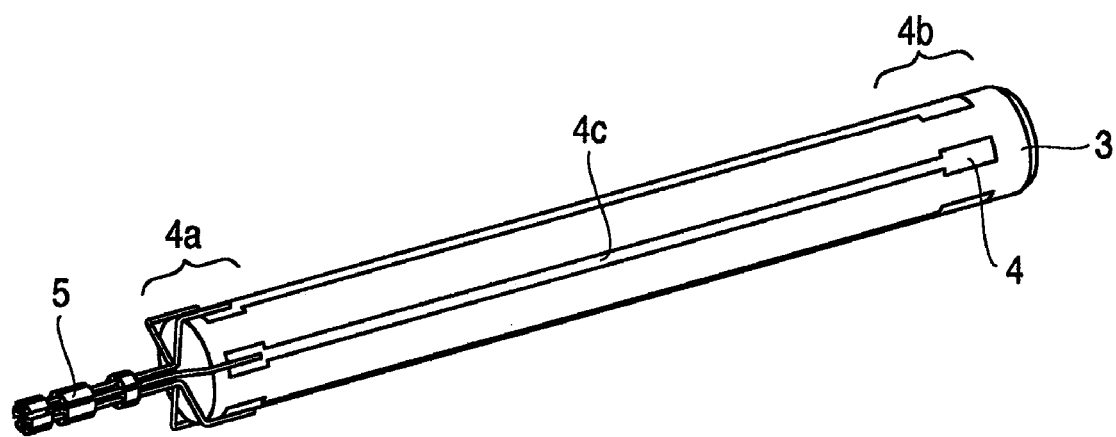
FIG. 3 is a diagram of an assembly state of a rod and a sensor element.

FIG. 3 illustrates an assembly state of the cylindrical rod 3 and a sensor element 5. The sensor element 5 for gas flow measurement is disposed on the side of the electrode portion 4a. The sensor element 5 and the electrode portion 4a are electrically connected with each other. The electrode portions 4a and 4b are connected with each other by a conductor 4c of the same kind formed by printing.

A seal portion is disposed in an increased-diameter portion that is located on the insertion hole 2 at the side of the electrode portion 4b. The seal portion is filled in a clearance between the insertion hole 2 and the cylindrical rod 3 to thereby seal the clearance airtight. Upon sealing the clearance, ceramic powder (for example, unsintered talc or the like) 6 is filled in the diameter-enlarged portion and is compressed by using a spacer (for example, washer) 7.

A terminal support glass 8 for holding terminals is fixed to the other axial end of the holder 1 which is located on the side of the electrode portion 4b. The terminal support glass 8 is made of glass and formed in a cylindrical shape with a closed end. The terminal support glass 8 covers the electrode portion 4b of the cylindrical rod 3. A cylindrical casing 9 is provided to cover the terminal support glass 8 at a predetermined clearance from an outer circumferential surface of the terminal support glass 8. One axial end portion of the casing 9 is fixed to a whole circumference of an outer circumferential surface of the holder 1 by laser welding. With the laser welding, the clearance between the casing 9 and the holder 1 is sealed airtight.

The other axial end portion of the casing 9 opposite to the sensor element 5 is filled with a cylindrical seal rubber 10. A plurality of harness wires 11 are drawn outwardly from the casing 9 through the seal rubber 10. The seal rubber 10 is fixed into the casing 9 by pressure. The seal rubber 10 ensures an airtight seal between the harness wires 11 and the seal rubber 10 as well as between the seal rubber 10 and the casing 9. Preferably, the seal rubber 10 is made of a high heat-resistant material, for example, fluorine-contained rubber.

An inner end of each of the harness wires 11 is connected to a terminal 12 which is retained in the terminal support glass 8. The terminal 12 is constructed as an elastic body, and surely comes into contact with each electrode 4 formed on the surface of the cylindrical rod 3 by an elastic force thereof. This contact portion can ensure conduction between the terminal 12 and the electrode 4.

The sensing probe of the gas flowmeter is fixedly mounted to a pipe by screwing a threaded portion 1a of the holder 1 into a tapped hole that is formed in the pipe, through which a gas to be measured flows. The sensor element 5 is disposed in a state of projecting into the pipe. A gasket seals a clearance between the sensing probe and the pipe.

In the foregoing description, the rod serving as the column of the sensing probe is a cylindrical shape, but the rod may have a rectangular shape.

Figure 4:
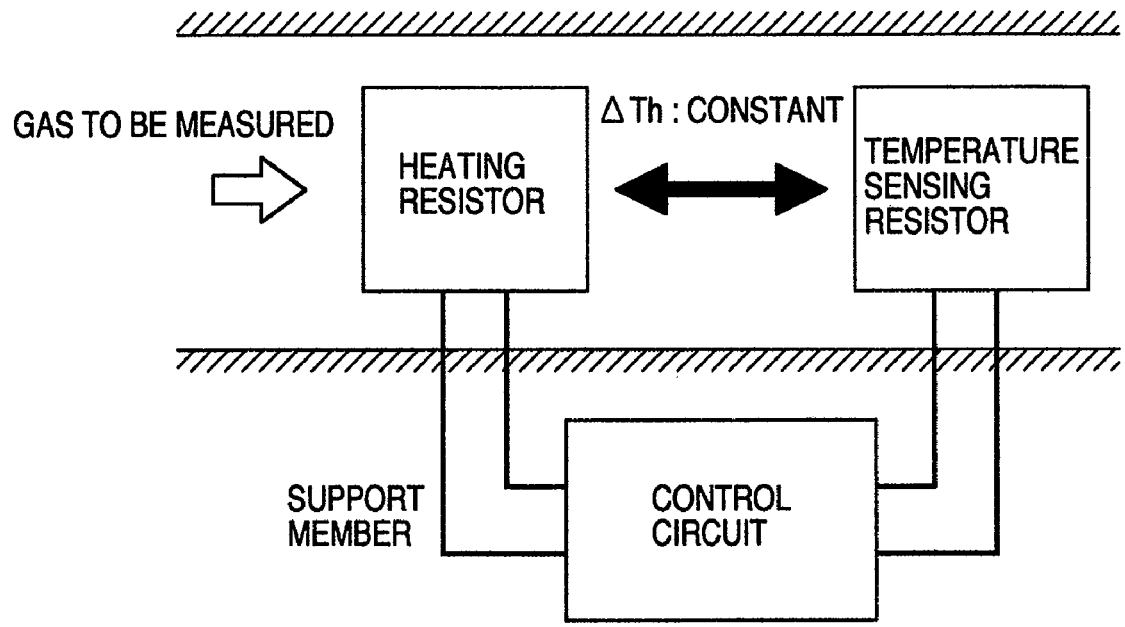
FIG. 4 is a diagram schematically illustrating the construction of an intake flowmeter.

Next, a flow measurement principle of an intake flowmeter for an automobile will be simply described. FIG. 4 illustrates the schematic construction of a thermal type gas flowmeter in which at least two resistors are disposed in a gas to be measured: one is used as a temperature sensing resistor for sensing gas temperature and another is used as a heating resistor for sensing a flow rate. A temperature difference $\Delta Th$ therebetween is maintained constant to measure a mass flow of the gas.

Figure 5:
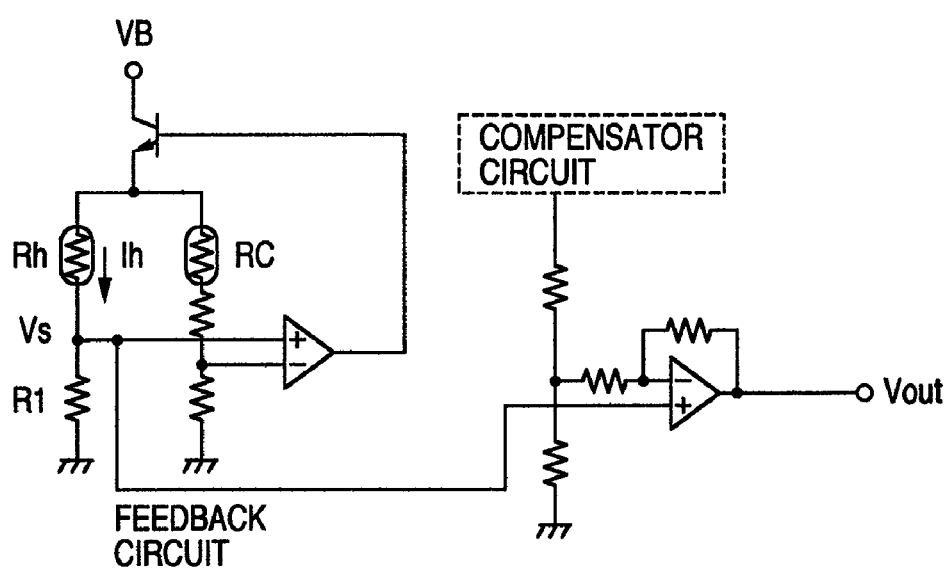
FIG. 5 is a diagram illustrating a construction of a bridge control circuit in the intake flowmeter.

FIG. 5 illustrates the construction of a bridge control circuit. The heating resistor and the temperature sensing resistor are disposed as bridge circuit resistors. Let Rh and Ih be the resistance of the heating resistor and a current flowing through the heating resistor, respectively. Then, the relationship between the whole quantity of heat Ph produced by the heating resistor, the mass flow Q of a gas flowing through the heating resistor, and the temperature difference $\Delta Th$ is represented by Equation (1).

$$Ph = Ih^2 Rh = (A + B\sqrt{Q})\Delta Th \quad (1)$$

Where A is the amount of heat (or heat leakage) transmitted from the heating resistor to a support member, and B is the amount of heat taken away by the gas and represented as a thermal constant. A voltage Vs at a midpoint between the heating resistor Rh and a fixed resistor R1 is represented by Equation (2) based on Equation (1). It can be seen that the voltage Vs depends on the mass flow of the gas. An output Vout from the sensor includes an analog voltage obtained by amplifying the voltage Vs.

$$Vs = R1 \cdot Ih = R1 \sqrt{\frac{1}{Rh}(A + B\sqrt{Q})\Delta Th} \quad (2)$$

Soilure is an important problem with a device which is used in an exhaust environment. Although the importance of the soilure depends on the purpose of use and the principle of operation of the device, soilure of the sensor element of the thermal type flowmeter would exert a fatal influence on maintenance of measurement accuracy.

In the exhaust environment of the internal combustion engine, nonvolatile components included in fine grain substances (PM), such as dry soot and ash discharged from the engine, bring about soilure. The dry soot is produced due to an insufficient mixing in amount of air taken and fuel injected into the combustion chamber of the engine, or due to insufficient oxidation. The soilure is produced due to adhesive forces of volatile components, such as SOF (Soluble Organic Components) and HC (Hydrocarbon) in the PM. The content of the volatile components is determined by combustion of the internal combustion engine.

Apparently, the soilure of the surface of the sensor element can be avoided by heating the temperature of the element to a high temperature (for example, 400° C. or more). The dry soot is usually oxidized and burnt down by setting the temperature of the element to 600° C. In view of the soilure of the sensing portion, the soilure of the support member of the sensor element can be effectively avoided by disposing a second heating resistor so as to prevent heat from being transmitted from the heating resistor for flow measurement to the support member.

Figure 6:
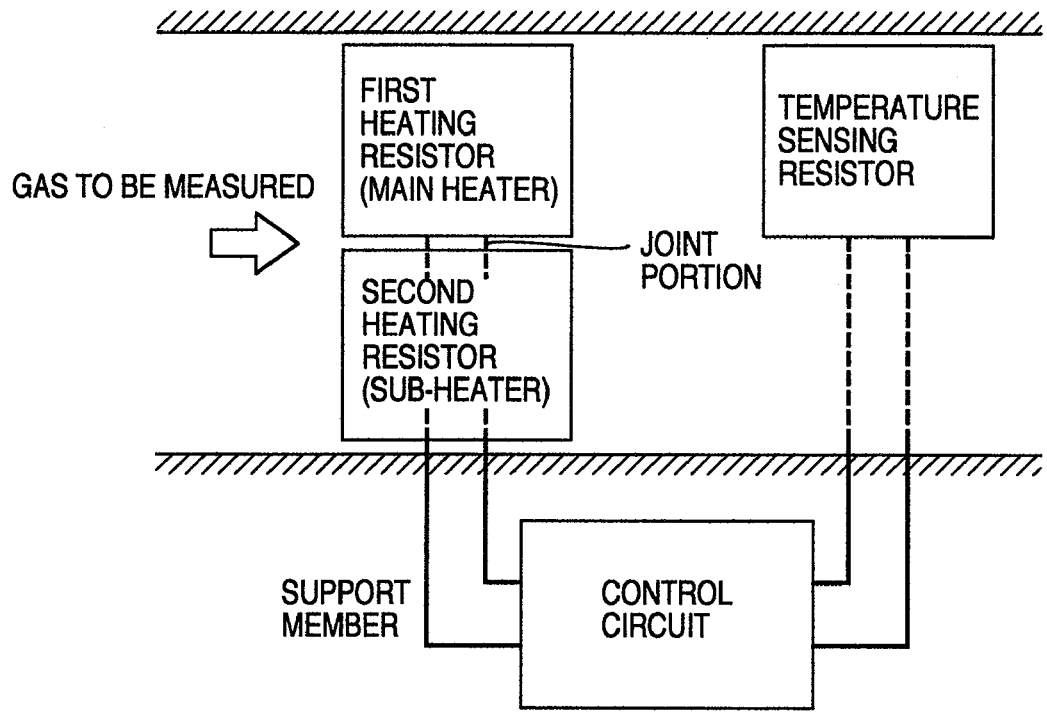
FIG. 6 is a diagram schematically illustrating a thermal type flowmeter having a sub-heater.

FIG. 6 illustrates the basic construction of a thermal type flowmeter having a second heating resistor. When FIG. 6 is compared to FIG. 1, there is a difference in that the second heating resistor (hereinafter, referred to as 'sub-heater') is disposed between a heating resistor for flow measurement (hereinafter, referred to as 'main heater') and a support member connected to a housing. The sub-heater intercepts transmission of heat from the main heater to the support member.

The reason why the arrangement of the sub-heater produces advantages will be described. In the Equation (1) described above, an error occurs when the thermal constant A changes before and after the soilure occurrence, which implies the amount of heat (heat leakage) transmitted from the heating resistor to the support member. By disposing the sub-heater, a produced amount of heat required by the main heater can be thermally separated from the amount of heat to be transmitted to the support member. That is, the gas flow can be measured regardless of soilure of the support member by providing a structure in which the amount of heat to be transmitted between the main heater and the sub-heater can be controlled at will.

Figure 7:
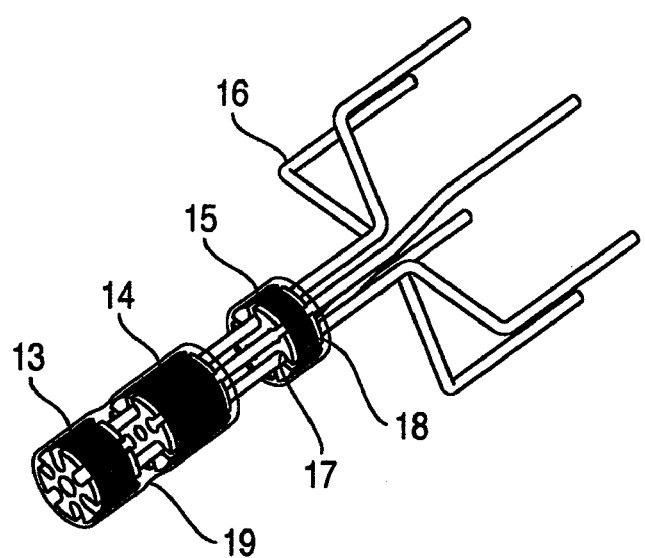
FIG. 7 is a diagram illustrating a structure of a sensor element having a sub-heater.

The structure of a sensor element in consideration of a countermeasure against soilure in the exhaust environment will be described with reference to FIG. 7. FIG. 7 illustrates the structure of a sensor element that takes the form of a coil type element. The structure of the sensor element is only exemplary so as to avoid soilure in theory and does not imply being restrictive and any sensor structure (for example, a plate-shaped platinum thin film resistor) may fall within the scope of the present invention insofar as the heat transmission is prevented.

Figure 8:
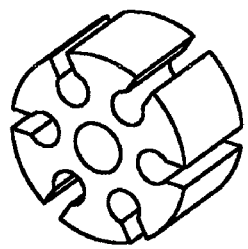
FIG. 8 is an exterior view of an insulating pipe.

In the sensor element, a main heater 13, a sensing wire 14, and a sub-heater 15 are disposed in that order from a tip of the sensor element. Each resistor is formed by winding a platinum wire 18 as a resistor of approximately 20 μm in a spiral shape on a pipe 17 with irregularly shaped section as an insulating base substance disposed in a skewered state on a concentric axis by six leads 16. As such, by supporting the sensor element in a cantilever manner, the sensor element can have a simple structure and be produced easily. Both ends of the platinum wire 18 are fixedly welded to the six leads 16. An insulating protective film 19 (Si-based glass) is formed to protect the platinum wire 18. FIG. 8 illustrates the exterior of the pipe with irregularly shaped section of the base substance. Preferably, the pipe with irregularly shaped section is made of ceramics, for example, alumina.

Figure 9:
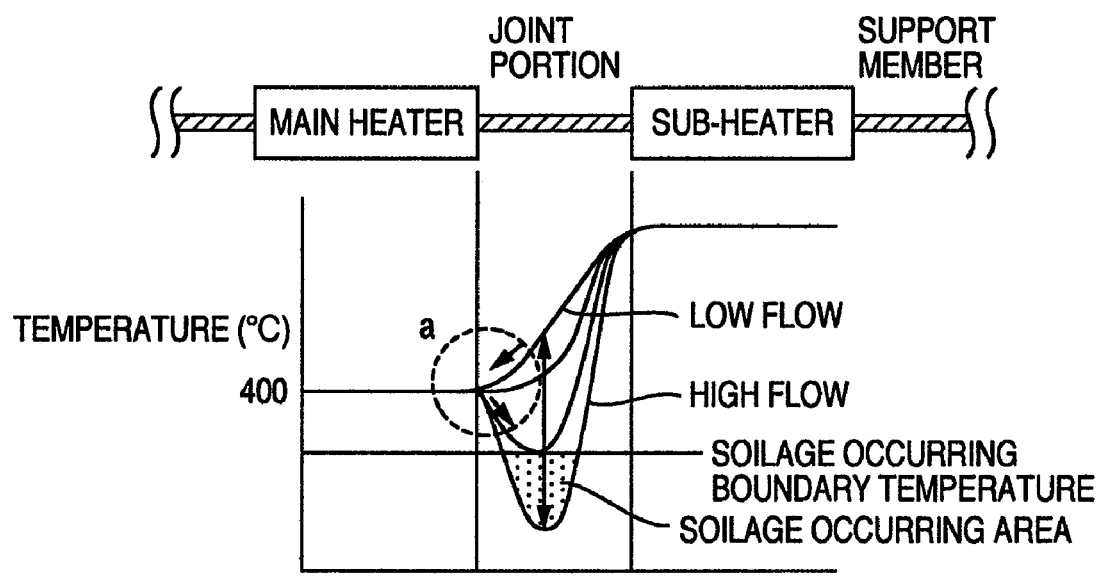
FIG. 9 is a diagram illustrating a problem with a sensor element having a sub-heater.
Figure 10:
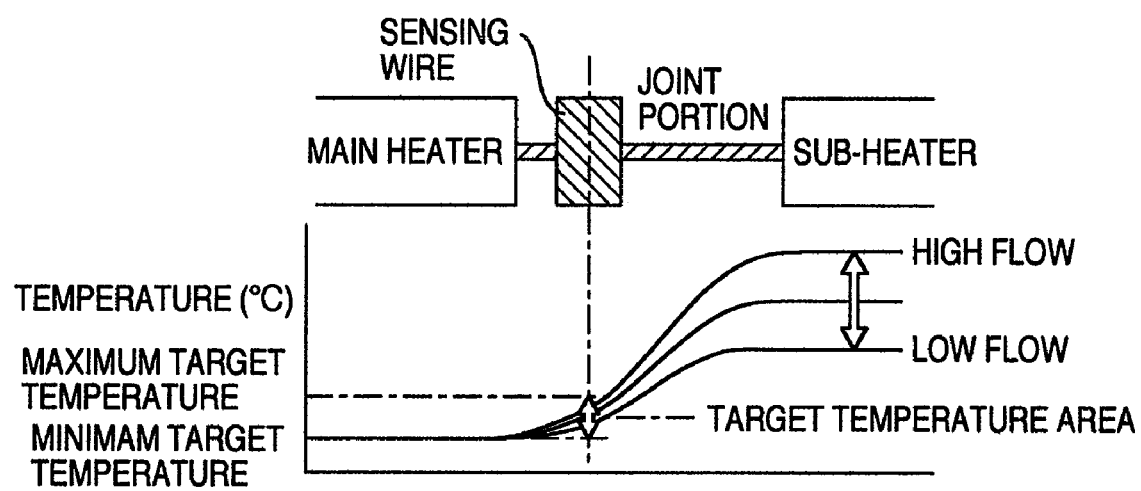
FIG. 10 is a diagram illustrating advantages of an additional sensing wire.

Next, the sensing wire will be described. FIG. 9 illustrates a problem with only a main heater and a sub-heater. It is assumed that the temperature of the main heater is set to 400° C. and the temperature of the sub-heater is set to a temperature higher than 400° C. A temperature of a joint portion between the main heater and the sub-heater changes depending on the flow rate (flow speed) of the gas flowing through the sensor element or a temperature of the gas. Especially, if both heaters are adjusted so as to maintain their target temperatures when the flow is at stop or small, the temperature of the joint portion in a high flow area may be lowered. If a situation continues in which the temperature of the joint portion is considerably lowered, there is a possibility that soilure occurs at the joint portion. It is inferred from the principle of the sensor element that when soilure occurs at the joint portion, the arrangement of the sub-heater becomes meaningless. Accordingly, measures for avoiding a remarkable decrease in the temperature of the joint portion are required. The sensing wire is arranged so as to control the temperature at the end of the main heater as the above countermeasure.

An ideal state is when a temperature gradient is zero at the end of the main heater. In this state, no heat flows from the sub-heater to the main heater and no heat flows to the joint portion in a reverse direction. Therefore, only heat taken away by the gas can be detected at all times, and thus the outstanding problem can be surely resolved.

During the operation, the temperature at the end of the main heater is detected by the sensing wire at all times and reflected in temperature control of the sub-heater.

As shown in FIG. 3, the thermal type gas flow rate measurement uses two resistors, that is, the heating resistor in which heat is taken away by the gas and the temperature sensing resistor which detects the temperature of the gas. It can be seen that the sensing probe shown in FIG. 1 is a sensing probe which only functions as a heating resistor. Although the structure becomes complicated, the heating resistor and the temperature sensing resistor which detects the temperature of the gas may be collected as a unit. Then, the measurement may be performed by a single sensing probe. Next, an embodiment in which the mass flow is measured by the sensing probe shown in FIG. 1 will be described.

Figure 11:
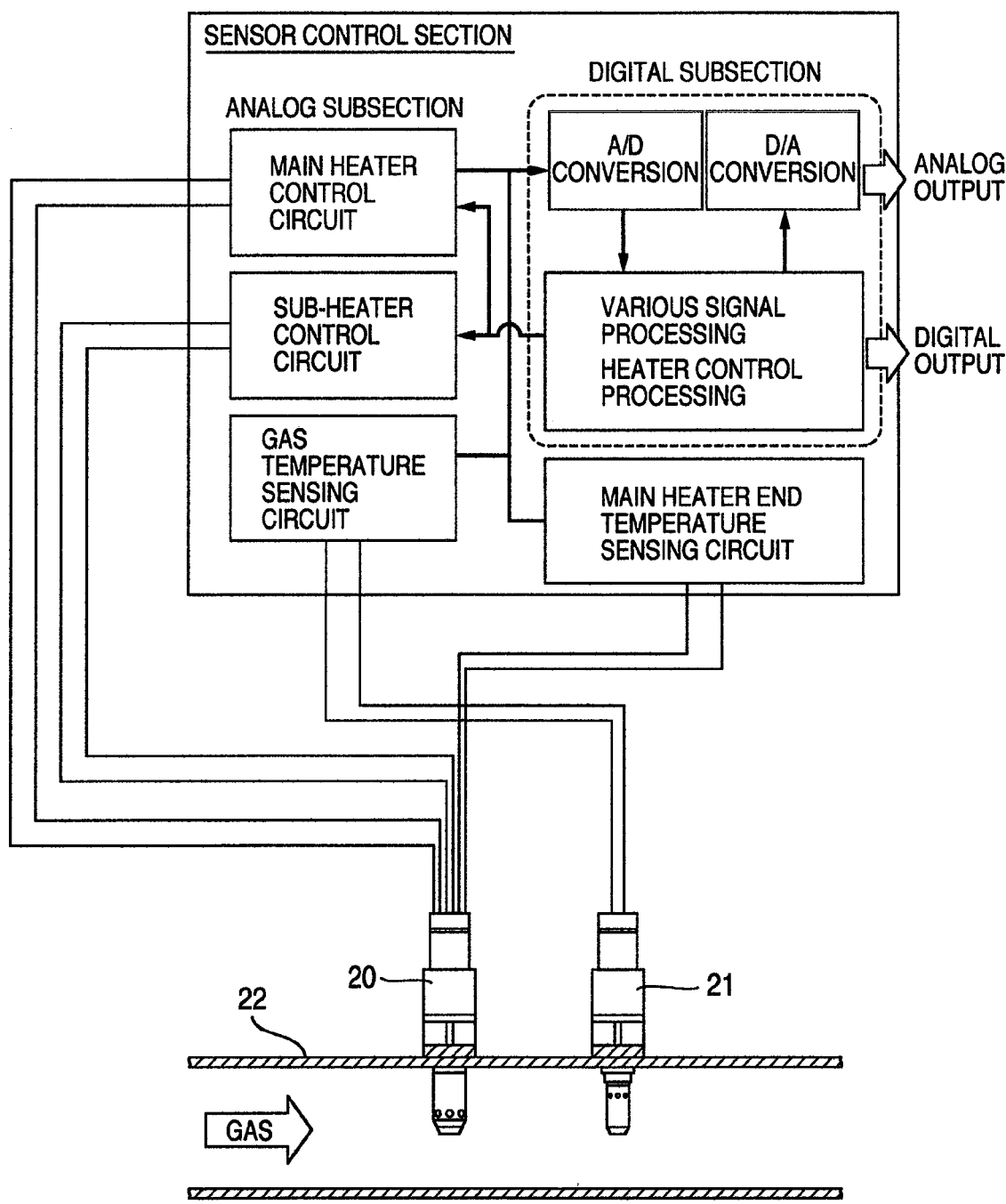
FIG. 11 is a diagram illustrating a construction of an embodiment according to the present invention.
Figure 12:
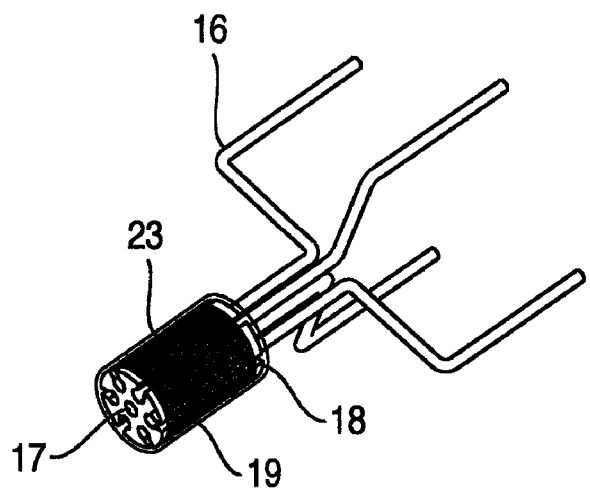
FIG. 12 is a diagram illustrating a structure of a sensor element for sensing gas temperature.

FIG. 11 illustrates the schematic construction of a control section for measuring a mass flow according to the present invention. Two probes, that is, a sensing probe 20 for a heating resistor and a sensing probe 21 for sensing gas temperature are mounted to a pipe 22 through which the gas to be measured flows at the same time. The probe 21 for sensing gas temperature may be implemented by applying only an element for sensing gas temperature to the base of the probe 20 for the heating resistor. FIG. 12 illustrates the exterior of an element for sensing gas temperature.

The sensing probes 20 and 21 are connected to a control section through the harness wires 11. By so separating the probe section from the control section, even if a high-temperature gas, such as an exhaust gas of an internal combustion engine, is measured, heat resistance can be ensured. When the temperature of the gas to be measured is low, the sensing probe may have the control function. The control section includes, at an input terminal, analog circuits, such as a main heater control circuit, a sensing wire temperature sensing circuit, and a gas temperature sensing circuit. Output values (analog signals) from the analog control circuits are input to a digital subsection, subjected to A/D conversion, processed based on various signals, and subjected to D/A conversion again. Then, a signal corresponding to a mass flow is output from the sensor module. Especially, the temperature of the sub-heater is controlled depending on the sensed temperature at the end of the main heater after the signal from the sensing wire is processed by the digital subsection.

Figure 13:
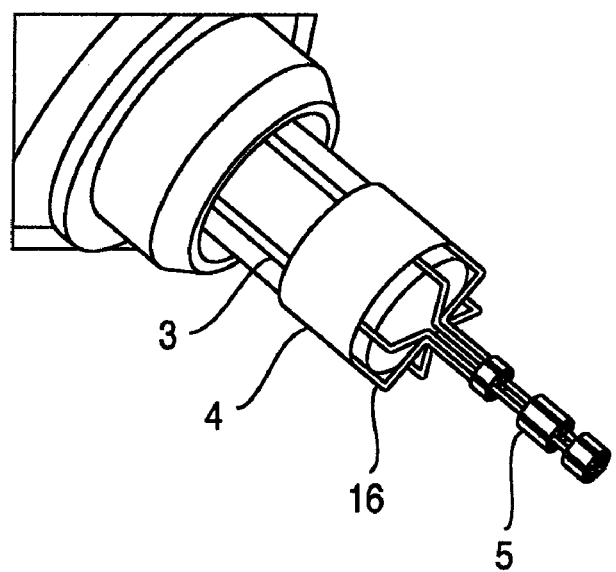
FIG. 13 is an enlarged view of the vicinity of the sensor element.
Figure 14:
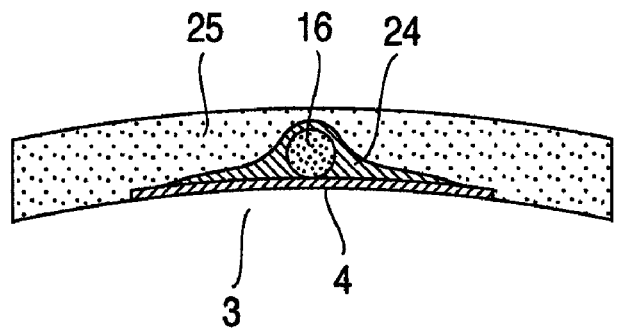
FIG. 14 is a cross-sectional view of a rod formed with an electrode and a lead connection portion.

Next, connection between an electrode on the surface of the rod and a lead of the sensor element will be described. FIG. 13 is an enlarged view of the vicinity of a sensor element. FIG. 14 is a cross-sectional view of a rod having an electrode and a lead connection portion. The electrode 4 is formed on the surface of the cylindrical rod 3. For example, the electrode 4 and the lead 16 are connected with each other by disposing an end of the lead 16 of the sensor element 5 to be in close contact with the electrode 4, and coating and sintering a conductor paste 24. An insulating protective layer 25 is formed on the conductor paste 24, thereby avoiding collision of high corrosive components or moisture in the gas and ensuring strength of the connection portion. Preferably, the conductor paste 24 for connection contains a platinum-based material having excellent corrosion resistance. The uppermost insulating protective layer 25 is formed by spraying particles, which primarily contain Si-based glass for protecting the surface of the sensor element or alumina, in the shape of spinel.

The electrode and the lead may be mechanically joined with each other by diffusion junction, such as ultrasonic welding or laser welding. Then, the electrode and the lead can be surely connected with each other.

Figure 15:
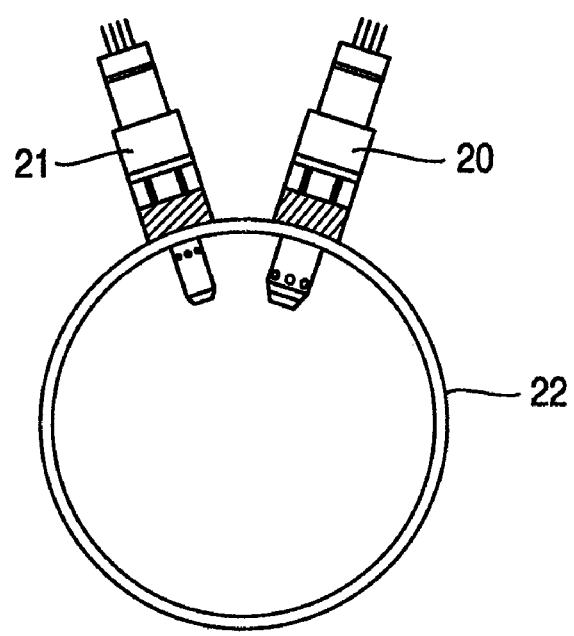
FIG. 15 is a diagram illustrating a construction when two sensing probes are used.

In respects to sensing the temperature of the gas, preferably, the temperature of the gas flowing through the main heater serving as the heating resistor is measured. A temperature of the exhaust gas of the internal combustion chamber is gradually lowered as the exhaust gas goes away from a combustion chamber. As described in the embodiment of the present invention, when two sensing probes are used, an ideal state is when they are aligned equally in a direction in which the gas flows. As shown in FIG. 15, the ideal construction may be implemented by disposing the sensing probe 20 for the heating resistor and the sensing probe 21 for sensing gas temperature on the same circumference of the gas pipe 22 at a given angle so as not to mechanically interfere with each other. Accordingly, even if two sensing probes are used, the mass flow can be measured with high accuracy.

Figure 16:
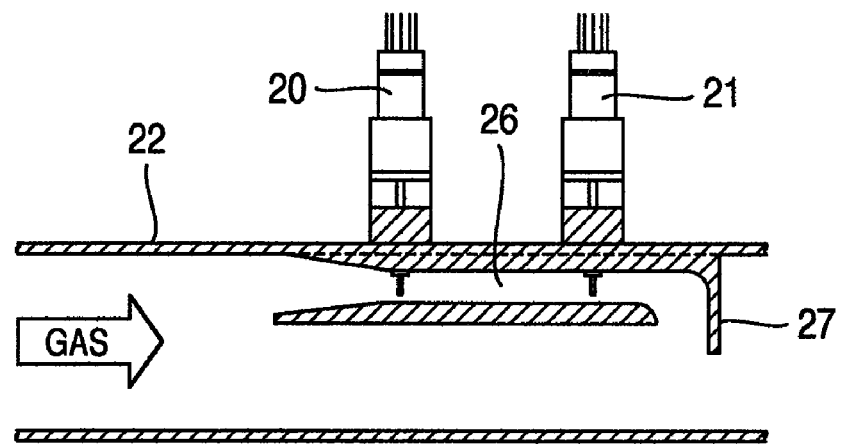
FIG. 16 is a diagram illustrating a construction when a sub-passage is formed in a gas pipe.

Another embodiment will be descried in connection with another cross-section in the similar perspective. For example, when a degree of spatial freedom is tolerant in the arrangement of sensing probes for a measurement instrument, not a vehicle, as shown in FIG. 16, a sub-passage 26 for gas to be measured is formed in the gas pipe to which sensing probes are mounted, and two sensing probes are disposed on the upper and lower positions with respect to the flow. In this case, preferably, the elements of the two sensing probes are disposed to be close to each other. However, since a pressure loss is caused by the amount corresponding to the sub-passage 26, it is important to form the sub-passage 26 to have a minimum sectional area.

A pulsation and a back flow in the gas pipe with respect to the gas flow measurement directly adversely affect measurement accuracy. In the example shown in FIG. 16, a back flow preventing member 27 is disposed at the most downstream end of the sub-passage 26. Accordingly, even if a back flow is large, stable measurement can be performed.

For example, as shown in FIG. 15, when a sub-passage is not formed or cannot be formed on the gas pipe, the sensing probe may have the corresponding function at a tip.

Figure 17:
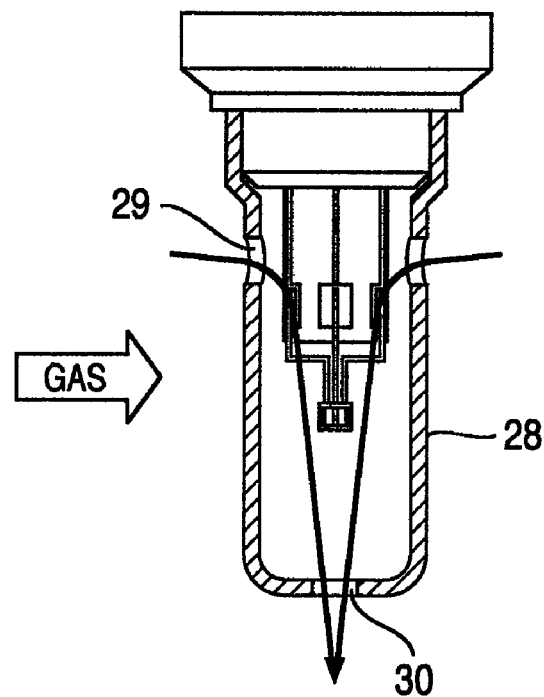
FIG. 17 is a diagram illustrating a structure of a distal end of a sensing probe for sensing gas temperature.

FIG. 17 illustrates the structure of a tip portion of a sensing probe for sensing gas temperature. The pulsation or back flow does not affect sensing of the temperature of the gas. Accordingly, what is necessary is that a protector 28 is mounted to prevent damage due to collision. The gas is introduced into the protector from a gas inlet port 29 provided in the side surface and is discharged from a gas outlet port 30 provided at the tip of the protector 28. At this time, it is necessary to pay attention to the structure of the tip of the sensing probe for the heating resistor. This is for the reason of the principle of measurement of the present invention which uses the amount of heat taken away by the gas from the heating resistor.

Figure 18:
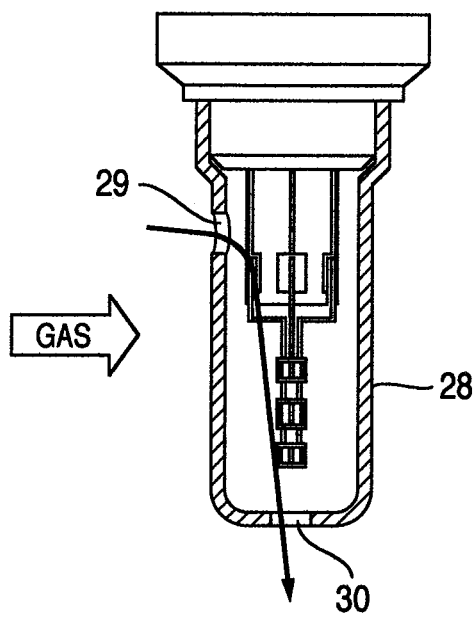
FIG. 18 is a diagram illustrating a structure of a distal end of a sensing probe for a heating resistor.
Figure 19:
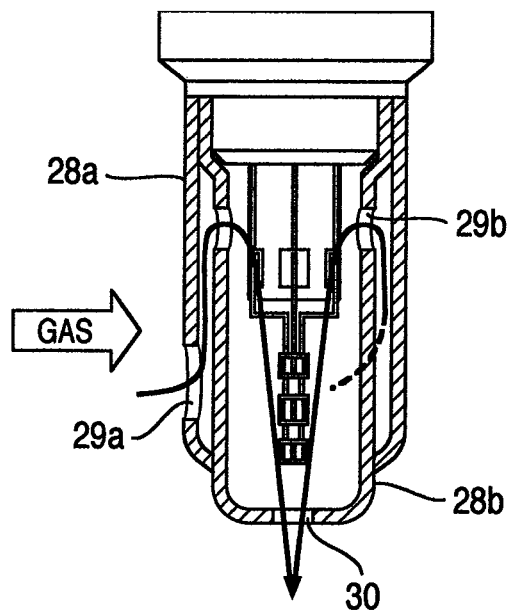
FIG. 19 is a diagram illustrating a structure of a distal end of a sensing probe for a heating resistor.

FIGS. 18 and 19 illustrate the structure of a tip of a sensing probe for a heating resistor. FIG. 18 illustrates a simple structure in which the gas introduced from a gas inlet port 29 formed in a surface against which the gas to be measured collides is discharged from a gas outlet port 30 provided at the tip of a protector 28 through the sensor element 5. FIG. 19 illustrates a structure in which a double tubular structure of an outer protector 28a and an inner protector 28b is applied. The tubular structure is formed in a cylindrical shape with a closed end. The gas introduced from a gas inlet port 29a formed in the surface of the outer protector 28a and against which the gas to be measured collides flows into a gas inlet port 29b formed in the surface of the inner protector 28b. Then, the gas passes through the sensor element 5 and is discharged from a gas outlet port 30 provided at the tip of the inner protector 28b. With this tubular structure, the pulsation or back flow which adversely affects measurement can be more suppressed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A gas flowmeter comprising, as a single body:
a rod-shaped member made of an insulating material;
a flow sensor provided at one end of the rod-shaped member;
an output section provided at the other end of the rod-shaped member;
surface wirings formed on a surface of the rod-shaped member to electrically connect the flow sensor to the output section; and
a seal member of the rod-shaped member provided between the flow sensor and the output section;
wherein said flow sensor has a first insulating member, a metal thin wire wound on said first insulating member and constituting a first heating resistor, and lead members electrically connecting said metal thin wire to said surface wirings and supporting said first insulating member on which said metal thin wiring is wound at a position apart from said one end of said rod-shaped member.

2. The gas flowmeter according to claim 1, further comprising a support member supporting the rod-shaped member and the seal member,
wherein the support member is fixed to an exhaust gas recirculation (EGR) pipe such that the flow sensor is disposed in the EGR pipe of an internal combustion engine.

3. The gas flowmeter according to claim 1,
wherein
said gas flowmeter further comprises a control circuit which is connected to the output section through a conductive wire to control power supply to the metal thin wire.

4. The gas flowmeter according to claim 3,
wherein the control circuit controls the temperature of the metal thin wire to be not less than 400° C.

5. The gas flowmeter according to claim 1,
wherein the rod-shaped member is made of ceramics and has a cylindrical shape.

6. The gas flowmeter according to claim 1, further comprising a passage forming member that forms a passage,
wherein the flow sensor is provided in the passage.

7. The gas flowmeter according to claim 6,
wherein the passage forming member is a metal can formed with a plurality of holes.

8. The gas flowmeter according to claim 1,
wherein the flow sensor includes a second heating resistor wound on a second insulating member, a temperature sensing resistor wound on a third insulating member and another plurality of lead members which electrically connect said second heating resistor and said temperature sensing resistor to respective ones of the surface wirings, and which are different from said lead members, and
said second heating resistor is supported on said plurality of lead members so as to be located in the vicinity of one end of said rod-shaped member with respect to said first heating resistor, and the temperature sensing resistor is supported on said plurality of lead members so as to be located between the first heating resistor and the second heating resistor.

9. An engine control system comprising:
the gas flowmeter according to claim 1 which is provided in an EGR pipe of an engine; and
a control device controlling control elements of the engine based on a signal from the gas flowmeter.

10. The engine control system according to claim 9,
wherein the control elements include at least one of the amount of a fuel to be supplied to the engine, a supply timing of the fuel to be supplied to the engine, and a constriction amount of the EGR pipe.

* * * * *